(12) United States Patent
Eliazar et al.

(10) Patent No.: US 10,824,738 B2
(45) Date of Patent: Nov. 3, 2020

(54) PRIVACY-PRESERVING ANALYSIS SYSTEM FOR SECURE MULTIPARTY COMPUTING

(71) Applicants: Austin I. D. Eliazar, Gainesville, FL (US); Andrew E. Kress, Villanova, PA (US); Bradley A. Malin, Nashville, TN (US)

(72) Inventors: Austin I. D. Eliazar, Gainesville, FL (US); Andrew E. Kress, Villanova, PA (US); Bradley A. Malin, Nashville, TN (US)

(73) Assignee: HealthVerity, Inc., Philadelphia, PA (US)

( * ) Notice: Subject to any disclaimer, the term of this patent is extended or adjusted under 35 U.S.C. 154(b) by 301 days.

(21) Appl. No.: 15/928,772

(22) Filed: Mar. 22, 2018

(65) Prior Publication Data

US 2019/0087589 A1  Mar. 21, 2019

Related U.S. Application Data

(60) Provisional application No. 62/559,924, filed on Sep. 18, 2017.

(51) Int. Cl.
*G06F 21/62* (2013.01)
*H04L 9/14* (2006.01)
(Continued)

(52) U.S. Cl.
CPC ........ *G06F 21/602* (2013.01); *G06F 21/6245* (2013.01); *H04L 9/0894* (2013.01);
(Continued)

(58) Field of Classification Search
CPC . G06F 21/6245; G06F 21/6254; H04L 63/04; H04L 63/0428
See application file for complete search history.

(56) References Cited

U.S. PATENT DOCUMENTS 9,619,669 B2 *  4/2017  LaFever .............. G06F 21/6254
9,760,298 B2 *  9/2017  Andrews ............... G06F 3/0622
(Continued)

OTHER PUBLICATIONS

Vaidya et al., Privacy-Preserving Decision Trees over Vertically Partitioned Data, 2008, ACM Transactions on Knowledge Discovery from Data, vol. 2, No. 3, Article 14 (Year: 2008).*

*Primary Examiner* — Khang Do
(74) *Attorney, Agent, or Firm* — Blank Rome LLP

(57) ABSTRACT

A privacy-preserving analysis system that provides functionality to analyze disparate data sets (and identify correlations) while making individual re-identification prohibitively difficult (even through repeated analysis). The system creates a large proxy data set by oversampling the underlying data and randomly masking a predictable number of fields in the proxy data sets to create sufficient uncertainty in the analysis results. The system may also use a distributed encryption process, secure communications, and secure multiparty computing to prevent personally-identifying information in remotely-stored underlying data from being determined. In the distributed encryption process, each of a plurality of distributed computing devices may be configured to encrypt personally-identifying information using an identical process (and identical encryption keys).

20 Claims, 8 Drawing Sheets

(51) Int. Cl.
*G06F 21/60* (2013.01)
*H04L 29/06* (2006.01)
*H04L 9/32* (2006.01)
*H04L 9/08* (2006.01)

(52) U.S. Cl.
CPC .............. *H04L 9/14* (2013.01); *H04L 9/3213* (2013.01); *H04L 63/0428* (2013.01)

(56) References Cited

U.S. PATENT DOCUMENTS

| | | | | |
|---|---|---|---|---|
| 2011/0277037 | A1* | 11/2011 | Burke | G06F 21/6245 726/26 |
| 2014/0040172 | A1* | 2/2014 | Ling | G06N 5/022 706/12 |
| 2014/0122442 | A1* | 5/2014 | Takenouchi | G06F 21/556 707/687 |
| 2016/0292455 | A1* | 10/2016 | Jebara | G06F 21/6245 |
| 2017/0177907 | A1* | 6/2017 | Scaiano | G06F 21/6254 |
| 2018/0358112 | A1* | 12/2018 | Sharifi Sedeh | G06F 16/122 |

* cited by examiner

| | First Name | Last Name | Sex | Date of Birth | Zip Code | Phone No. | SSN |
|---|---|---|---|---|---|---|---|
| Personal Information | John | Smith | Male | 29/02/2000 | 10001 | (212) 555-1234 | 123-00-6789 |
| Individual Tokens | 0x2A95BF49110CA6 | | M | 0x2369 | 100 | 0xC78F1A02 | 0x5BE4ADD5 |

| | First Name | Last Name | Sex | Date of Birth | Zip Code | Phone No. | SSN |
|---|---|---|---|---|---|---|---|
| Personal Information | Maria | Garcia | Female | 29/02/2000 | 94041 | (650) 555-1234 | 876-00-3210 |
| Individual Tokens | 0x776038B1B430 | | F | 0x2369 | 940 | 0xC8D21702 | 0x55901E1F |

| | First Name | Last Name | Sex | Date of Birth | Zip Code | Phone No. | SSN |
|---|---|---|---|---|---|---|---|
| Personal Information | Mary | Garcia | Female | 29/02/1960 | 94043 | (415) 555-5678 | - |
| Individual Tokens | 0x77C088B7A430 | | F | 0x168F | 940 | 0xAC63E61 | - |

FIG. 7

PRIVACY-PRESERVING ANALYSIS SYSTEM FOR SECURE MULTIPARTY COMPUTING

CROSS REFERENCE TO RELATED APPLICATIONS

This application claims priority to U.S. Provisional Patent Application No. 62/559,924 filed Sep. 18, 2017, the entire contents of which is hereby incorporated by reference.

BACKGROUND

Every individual has information regarding that individual stored in dozens of databases across multiple industries. Identifying correlations in those disparate data sets can offer countless insights that are useful in a variety of disciplines. To use just one example, a health practitioner may be interested to know which of their patients are statistically more likely to forego taking their prescribed medication so that the practitioner can make an effort to intervene. By combining health records with other data (for example, purchase history), correlations may become apparent that can be used to identify other patients that may be statistically more likely to exhibit the same behavior. For example, there may be a correlation between patients that purchase fast food and those that forego taking prescribed medication.

Because of privacy regulations (and other ethical and business considerations), however, it is vitally important to protect the privacy of each individual. Anonymizing the data by encrypting personally-identifying information (e.g., name, date of birth, etc.) is an important first step. Additionally, if the information being analyzed is stored in disparate locations, secure multiparty computation (SMC) may be used so that both parties can compute a function over their inputs without revealing those inputs to the other party.

However, anonymizing the data and secure multiparty computation is insufficient because the data may also include other information regarding individuals (called "quasi-identifiers"). Each quasi-identifier is not sufficient to identify an individual on its own. However, quasi-identifiers are sufficiently unique to that individual that, when combined, they can be used to identify an individual.

For example, when AOL publicly released anonymized search histories of a large number of AOL users, journalists were able to re-identify users by combining multiple pieces of information that were sufficiently unique to those users. Similarly, when Netflix released anonymized movie ratings of 500,000 subscribers and offered a prize to whomever could develop a better recommendation engine, researches used quasi-identifiers to de-anonymize the data.

Examples of quasi-identifiers in the context of health information include dates (such as birth, death, admission, discharge, visit, and specimen collection), locations (such as postal codes, hospital names, and regions), race and ethnicity, languages spoken, aboriginal status, profession, and gender. Other important quasi-identifiers include income, socio-economic status, martial status, children, political affiliations. Some relevant medical information may also be a quasi-identifier (such as height and weight or BMI), especially when they are outliers. Taken separately, no one element can sufficiently re-identify an individual, but if enough of them are considered together, they can pose a significant threat to a person's privacy. If two parties have access to data sets with different quasi-identifiers, the distinct data sets may preserve privacy in their own right, but taken together would be vulnerable. Therefore, inadvertent leaking of even one seemingly innocuous field may be a threat to privacy. In the digital age, the amount of information that is reasonably available on a person is continually growing creating a constantly shifting definition of quasi-identifiers.

This risk of exposing quasi-identifiers is most acute when systems can be queried multiple times. For example, consider a user that requests a subset of users and the system returns a group of people (e.g., Alice, Bob, Charlie, Denise, Edward, Frances, and Greg). Then the user makes additional requests based on the results of that information. If the user makes a similar request for the same group plus one (e.g., Alice, Bob, Charlie, Denise, Edward, Frances, Greg, and Helen), then a user could normally find out a lot about the new individual (in this instance, Helen) by looking at what changed in the answer. Our system protects against this very real type of vulnerability.

Accordingly, there is a need for a system that analyzes disparate data sets to identify correlations that makes individual re-identification prohibitively difficult, even through repeated analysis.

SUMMARY

In order to overcome those and other drawbacks of conventional systems, there is provided a privacy-preserving analysis system that creates a large proxy data set by oversampling the underlying data and randomly masking a predictable number of fields in the proxy data sets to create sufficient uncertainty in the analysis results that individual re-identification becomes prohibitively difficult even through repeated analysis. The disclosed system also corrects for the oversampling as well as the masking of certain fields in the proxy data sets.

The disclosed system may also use a distributed encryption process, secure communications, and secure multiparty computing to prevent personally-identifying information in remotely-stored underlying data from being determined. In the distributed encryption process, each of a plurality of distributed computing devices may be configured to encrypt personally-identifying information using an identical process (and identical encryption keys). The distributed encryption process may also use a centrally stored master person index to ensure that duplicate identifiers are not created for the same individual.

Exemplary embodiments provide technical improvements to existing systems that gather and provide statistical information from the join of remotely-stored data by preventing individual re-identification even via repeated analysis of the same or different data sets.

BRIEF DESCRIPTION OF THE DRAWINGS

Aspects of exemplary embodiments may be better understood with reference to the accompanying drawings, wherein:

FIG. 7 illustrates personally-identifying information and example identifier tokens according to an exemplary embodiment of the present invention.

DETAILED DESCRIPTION

Figure 1:
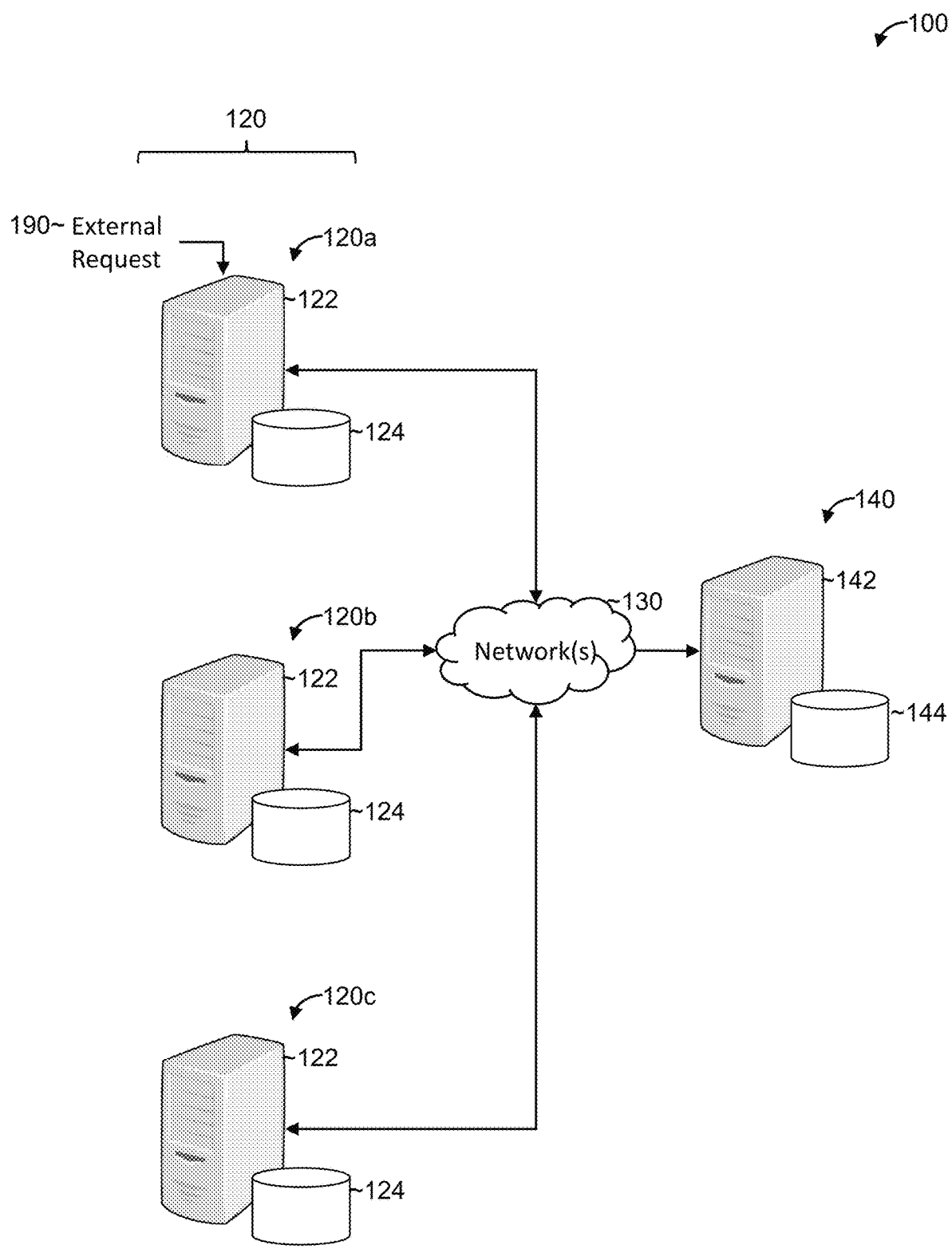
FIG. 1 illustrates an architecture of a privacy-preserving analysis system according to an exemplary embodiment of the present invention.

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

FIG. 1 illustrates an architecture 100 of a privacy-preserving analysis system 200 according to an exemplary embodiment of the present invention.

As shown in FIG. 1, the architecture 100 includes a processing unit 122 and computer readable storage media 124. In some embodiments, the architecture 100 may include multiple remote locations 120 (individually represented as 120a through 120c) and a central location 140. Each of the remote locations 120 include a processing unit 122 and computer readable storage media 124. The central location 140 also includes a processing unit 142 and computer readable storage media 144. Each of the processing units 122 at the remote locations 120 communicate with the processing unit 142 at the central location 140 via one or more networks 130. Each of the processing units 122 at the remote locations 120 communicate with each other either directly or indirectly via the processing unit 142 at the central location 140. At least one of the remote locations 120 is able to (directly or indirectly) receive outside service requests 190 (and respond to those outside service requests 190) and may temporarily be designated the lead collaborator (represented as 120a in the example shown) for the duration of a single analysis request.

Each processing unit 122 or 142 may include a suitable hardware computing device (e.g., a server, a desktop computer, etc.) that executes instructions to perform the functions described herein. Each processing unit 122 or 142 may include internal storage and one or more hardware computer processors. The computer readable storage media 124 or 142 may include any non-transitory medium (e.g., a hard disk, solid-state memory, etc.) configured to store the data described herein. The one or more networks 130 may include one or more short-range or long-range data connections that enable the processing units 122 and 142 to communicate. The data connections may include wired and/or wireless data connections. The one or more networks 130 may include local area networks or wide area networks (e.g., cellular networks, the internet, etc.).

Figure 2:
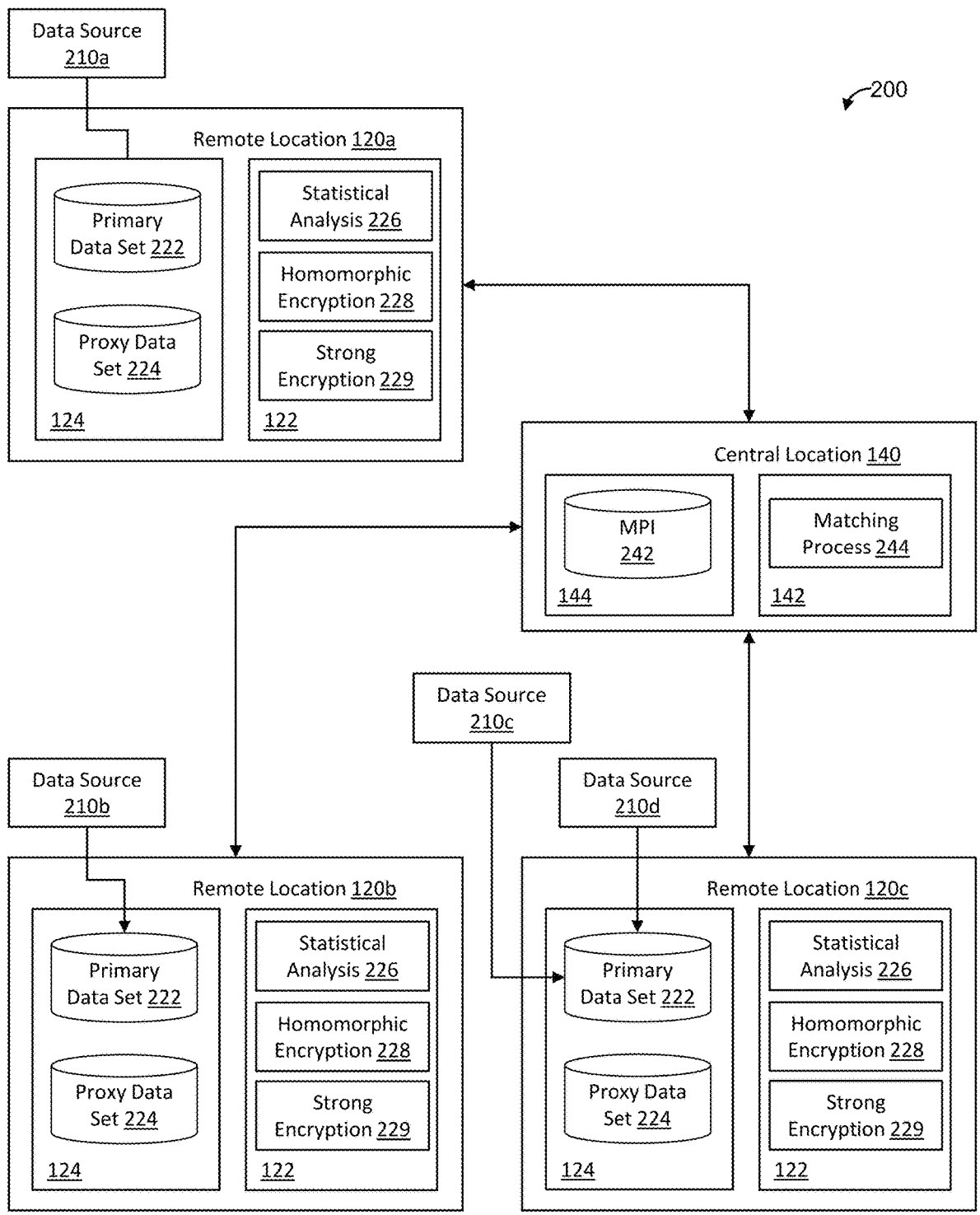
FIG. 2 illustrates the privacy-preserving analysis system according to an exemplary embodiment of the present invention.

FIG. 2 illustrates the privacy-preserving analysis system 200 according to an exemplary embodiment of the present invention.

In some embodiments, the system 200 includes software functions performed by a processing unit 122 and data sets stored on computer readable storage media 124 at a single location 120. As shown in FIG. 2, in other embodiments, the system 200 includes software functions performed by the processing units 122 and 142 and data sets stored on the computer readable storage media 124 and 144 at the one or more remote locations 120 and the central location 140.

Each remote location 120 stores a primary data set 222 and a proxy data set 224 on the computer readable storage media 124. Each of the primary data sets 222 may be received from one or more outside data source(s) 210 (represented as 210a through 210d).

Each of the primary data sets 222 may include disparate information from disparate sources regarding the same individuals. For example, the primary data set 222 at the remote location 120a may include medical records while the primary data set 222 at the remote location 120b may include purchase histories. As described above, identifying correlations in both of those data sets can offer countless insights that are useful in a variety of disciplines. However, because of privacy regulations (and other ethical and business considerations), it is vitally important to protect the privacy of each individual in all of the primary data sets 222. Anonymizing the primary data sets 222 by encrypting personally-identifying information (e.g., name, date of birth, etc.) is an important first step, but is insufficient because the primary data sets 222 may also include "quasi-identifiers" that are sufficiently unique to that individual that they can be used to identify an individual when combined with other quasi-identifiers. As described in detail below, the system 200 allows users to find correlations in a disparate data sets 222 (stored, for example, in separate remote locations 120) such that individual re-identification is prohibitively difficult.

The primary data sets 222 include data records that include at least one piece of personal-identifying information, such as name or phone number. In order to join disparate data records from the primary data sets 222, the system 200 uses the central location 140 to create a unique identifier for each individual without disclosing the identity of that individual. Each additional remote location repeats the process with their own data set, so that a single person is assigned the same identifier across all data sets.

In order to perform the functions described below, the processing unit(s) 122 may include a number of software modules including statistical analysis 226, strong encryption 228, and homomorphic encryption 229. In some embodiments, the system 200 performs an optional process 600 (described below with reference to FIG. 6) for creating a unique identifier for each individual with at least one data record in any of the primary data sets 222 at any of the remote locations 120. In those embodiments, the central location 140 stores a master person index 242 on computer readable storage media 144 and the processing unit 142 at the central location 140 includes a matching process software module 244 that performs steps 616-620 of FIG. 6.

Figure 3:
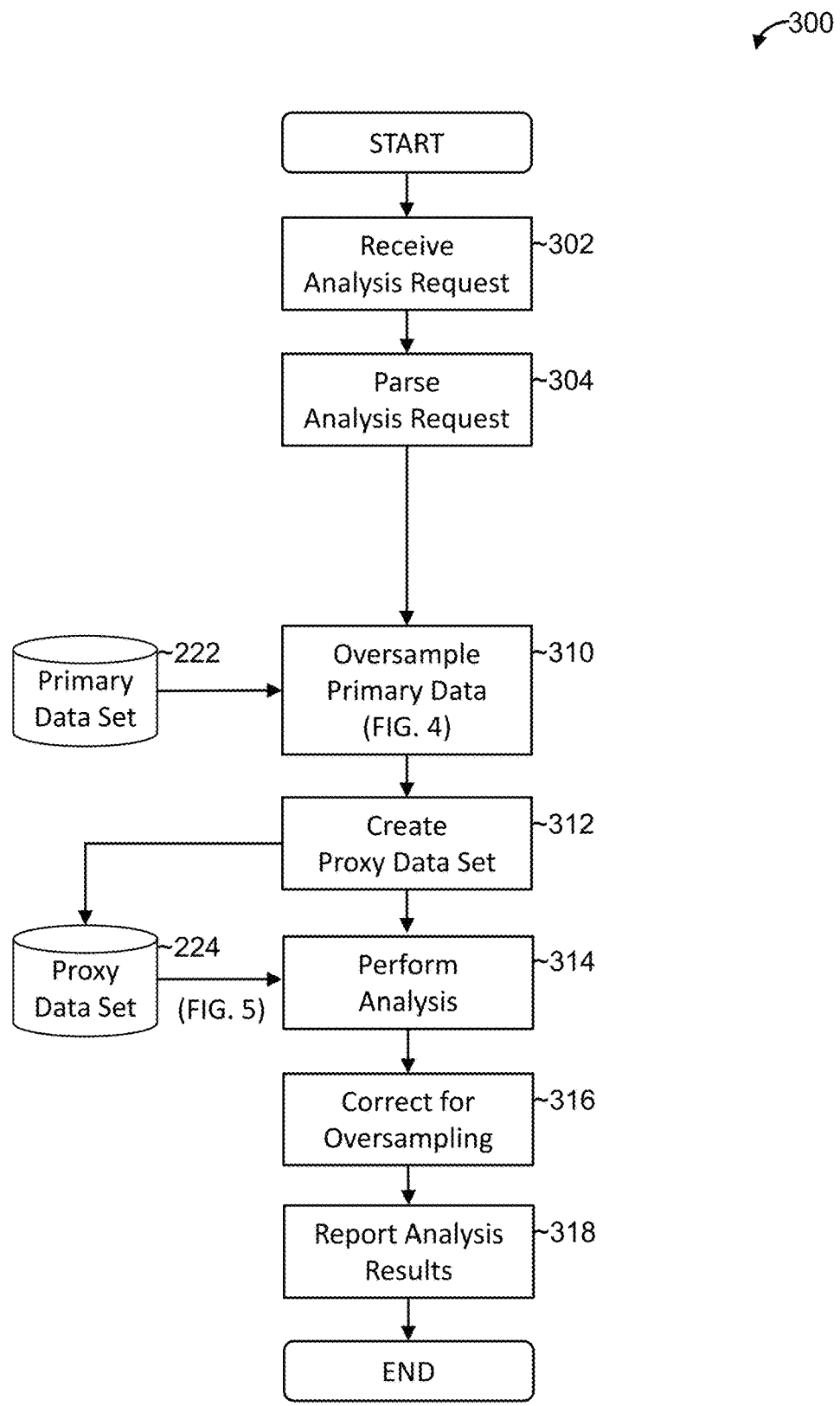
FIG. 3 is a flowchart illustrating a process for performing analysis while preserving the privacy of the individuals according to an exemplary embodiment of the present invention.

FIG. 3 is a flowchart illustrating a process 300 for performing analysis while preserving the privacy of the individuals with records included in one or more primary data sets 222 according to an exemplary embodiment of the present invention. The process 300 illustrated in FIG. 3 may be performed by a processing unit 122 at a single location 120 using one or more primary data sets 222 stored locally on the computer readable storage media 124 at the single location 120. (A process 800 for multiple processing units 122 to perform analysis using primary data sets 222 stored in multiple locations 120a, 120b, 120c, etc. is described below with reference to FIG. 8.)

As shown in FIG. 3, an analysis request generated by a user is received by the lead collaborator 120a in step 302. The analysis request may indicate the population of primary data records from the primary data set 222 to be used for analysis, the data fields available, optional configuration arguments that may customize the analysis, etc.

The analysis request is parsed in step 304. The analysis request may be parsed, for example, to identify relevant parameters to perform the analysis (such as the data fields and population to be used for the analysis, stopping criteria, the preferred measure of information gain, etc.). The population may be designated by the unique identifiers shared by the remote locations 120, or by another designated identifier shared by the lead collaborator 120a and the requesting party, or even as a set of criteria on the field values in the primary data sets 222 (for example, males 18-45 years old with type 1 diabetes). The request may optionally include additional data fields to be used in the analysis, including target labels for the partitioning.

The lead collaborator 120a fetches the corresponding data records from its primary data set 222 in step 310. As described above, even though the data records in the primary data sets 222 have been anonymized (by replacing the personally-identifying information with identifier tokens), the primary data sets 222 contains "quasi-identifiers" that, through repeated analysis of the data, may be used to re-identify individuals. Therefore, in order to ensure the privacy of the individuals in the data records even through repeated analysis of the data, each remote location 120 oversamples the data records in the primary data set 222 in step 310 and stores the oversampled data records as a proxy data set 224 in step 312. As described in detail below, creating the proxy data set 224 and using the proxy data set 224 when performing the requested analysis provides sufficient uncertainty in the population counts of the analysis that individual re-identification from multiple analyses is prohibitively difficult.

Figure 4:
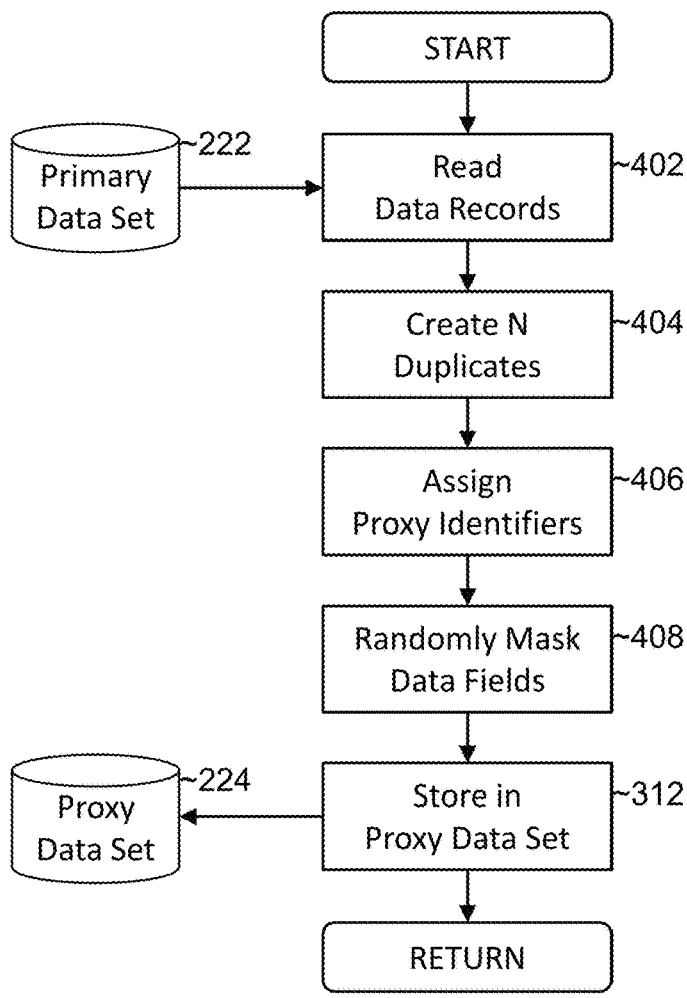
FIG. 4 is a flowchart illustrating a process of oversampling the data records and creating a proxy data set in detail, according to an exemplary embodiment of the present invention.

FIG. 4 is a flowchart illustrating a process 400 of oversampling the data records (step 310) and creating the proxy data set (step 312) in detail, according to an exemplary embodiment of the present invention.

As shown in FIG. 4, each data record is read from the primary data set 222 in step 402. Duplicates of each data record are created in step 404. The lead collaborator 120a creates the same number of duplicates each data record, so that exactly N proxy data records are created for each data record in each of the primary data sets 222. Each proxy data record is assigned a unique proxy identifier in step 406.

Each proxy data record has a number of its fields masked out in step 408. The masking is performed in an unpredictable but repeatable fashion, so that the average rate that any given field is masked out is P. For example, the lead collaborator 120a may use a pseudo-random number generator where the seed is a combination of the proxy identifier and a fixed secret salt. Note that both N and P are configurable, but are intended to remain constant for a specific embodiment of the invention. The proxy data records are added to the proxy data set 224 in step 312. The process is performed for each of the data records in the primary data set 222 necessary to perform the requested analysis.

Referring back to FIG. 3, the requested analysis is performed using the proxy data sets 224 in step 314. The requested analysis is performed, for example, by the statistical analysis module 226 (shown in FIG. 2). Because the system 200 is performing the requested analysis using data records that have been duplicated and that include fields that have been randomly masked, the system 200 uses a specific process to read each of the proxy data sets 224.

Figure 5:
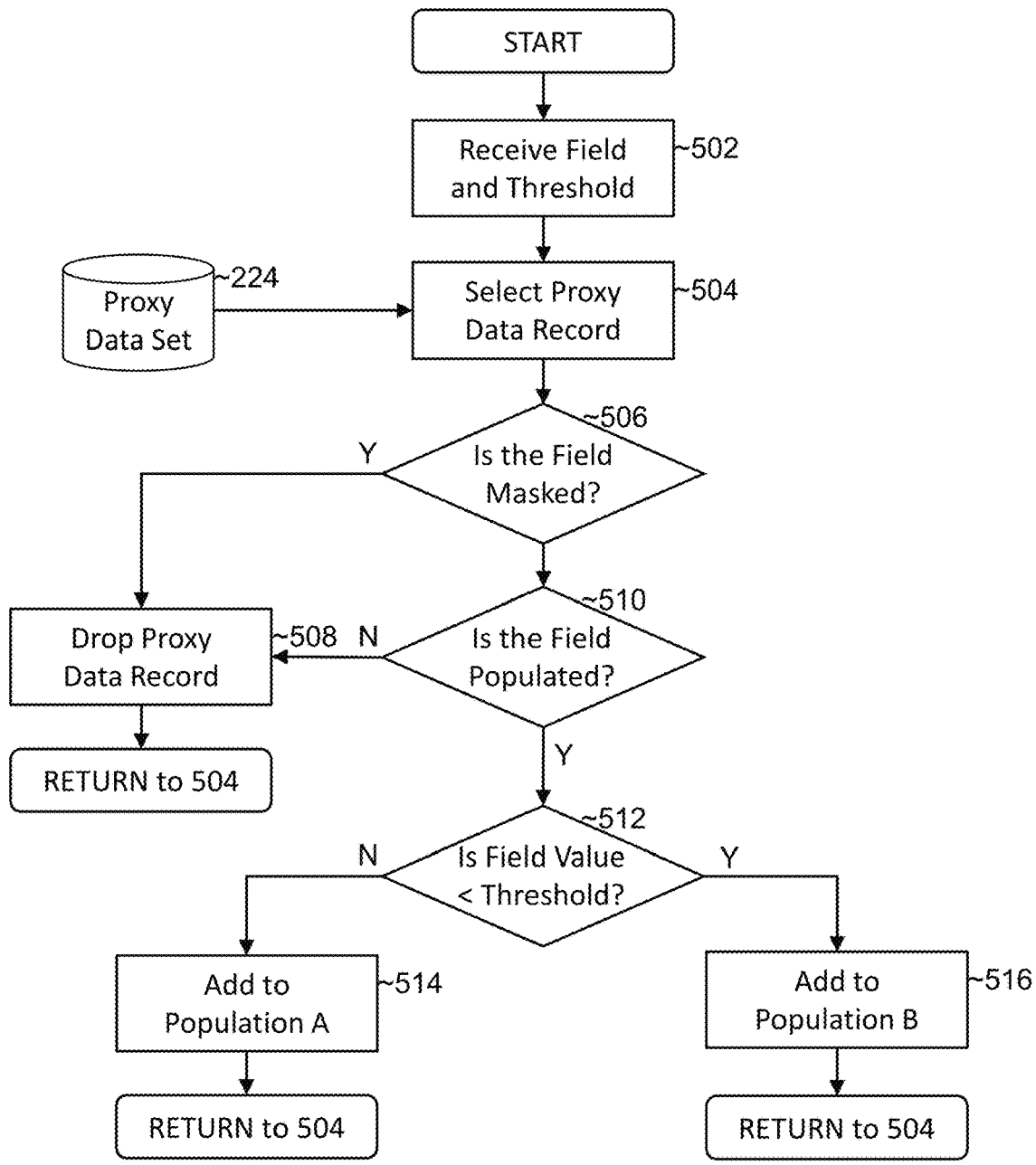
FIG. 5 is a flowchart illustrating a process for performing the requested analysis using the proxy data set according to an exemplary embodiment of the present invention.

FIG. 5 is a flowchart illustrating a process 500 for performing the requested analysis using the proxy data set 224 according to an exemplary embodiment of the present invention.

As described above, the system 200 determines whether having a data record with a certain field over a certain threshold is correlated with other data, for example stored in another data set 222. (The example given above was whether eating fast food was correlated with taking prescribed medication.) In order to find those correlations, the total population must be separated (petitioned) into those that meet the threshold and those that do not (shown in FIG. 5 as population A and population B). Using the proxy data sets 224, where a certain percentage (P) fields are masked, however, adds an additional layer of complexity.

The field and the threshold used as a potential splitting criterium are received in step 502. A proxy data record is selected from the proxy data set 222 in step 504. If the field being used to partition the data is masked in that proxy data record, it is unknown whether that individual is included in population A or population B. Accordingly, it is determined whether the field is masked in step 506. If so (step 506: Yes), the proxy data record is dropped in step 508, meaning that proxy data record is not included in either population A or population B and is not considered for any further processing. Similarly, if the field being used to partition the data is not populated, it is similarly unknown whether that individual is included in population A or population B. Accordingly, it is determined whether the field is populated in step 510. If not (step 510: No), the proxy data record is similarly dropped in step 508. If the relevant field is not masked (step 506: No) and populated (step 510: Yes), a determination is made whether the relevant field is meets the relevant threshold in step 512 and the proxy data record is added to either population A in step 514 or population B in step 516 based on that determination. Steps 504-516 are repeated for all of the proxy data records in the proxy data set 224.

The partitioning process 500 may be a recursive process that repeatedly subdivides population A or population B into two or more smaller subpopulations based on additional fields and thresholds. However, in order to prevent the system 200 from being used to determine small subpopulations of individuals with specific characteristics, the system 200 may be configured to reject or prune any generated partition rule that would create a subpopulation of less than K individuals. The fixed minimum population size of K may remain fixed across all instances of the process on the same data set.

Referring back to FIG. 3, the requested analysis is performed as described above in step 314, meaning the system 200 determines the number of proxy data records that satisfy the criteria in the analysis request. In step 316, system 200 corrects for the fact that the proxy data records are N duplicates of the primary data records, in which P percent of the fields are expected to have been masked. In order to estimate what the results of the same analysis using the data records from the primary data set 222, the results of the analysis from the proxy data records from the proxy data set 224 are divided by $N*(1-P)^B$, where N is the oversampling factor, P is the probability of masking any given field, and B is the number of times that the population was subdivided as shown in FIG. 5 (and, therefore, the number of times that P percentage of the proxy data records were dropped in step 508 after it was determined that the relevant field was masked in step 506). The lead collaborator 120*a* reports the results of the analysis to the requesting party in step 318.

By performing the requested analysis using a large population of proxy data records that have been randomly masked, the system 200 creates sufficient uncertainty in population counts as to make individual re-identification prohibitively difficult. For example, instead of determining that exactly 47 individuals meet a specified criteria, a user of the system 200 may determine that approximately 46 (or 48) individuals meet that criteria. Additionally, the system 200 may intentionally reduce the precision of the analysis by rounding off the reported population to the nearest multiple of M. For example, instead of reporting that approximately 46 individuals meet the specified criteria, the reported population may be rounded to the nearest multiple of 5 and output that approximately 45 individuals meet the specified criteria. (The parameters N, P, and M may be configurable terms that are set prior to a request for analysis that remain constant until the request is fulfilled. These configuration terms may be provided as part of the response, if requested.)

FIGS. 3 through 5 illustrate a flowchart illustrating processes 300, 400, and 500 for performing analysis by at a single location 120 using one or more primary data sets 222 stored locally. However, the privacy-preserving analysis system 200 may also be used to analyze multiple primary data sets 222 stored in multiple remote locations 120*a*, 120*b*, 120*c*, etc. as described below.

Figure 6:
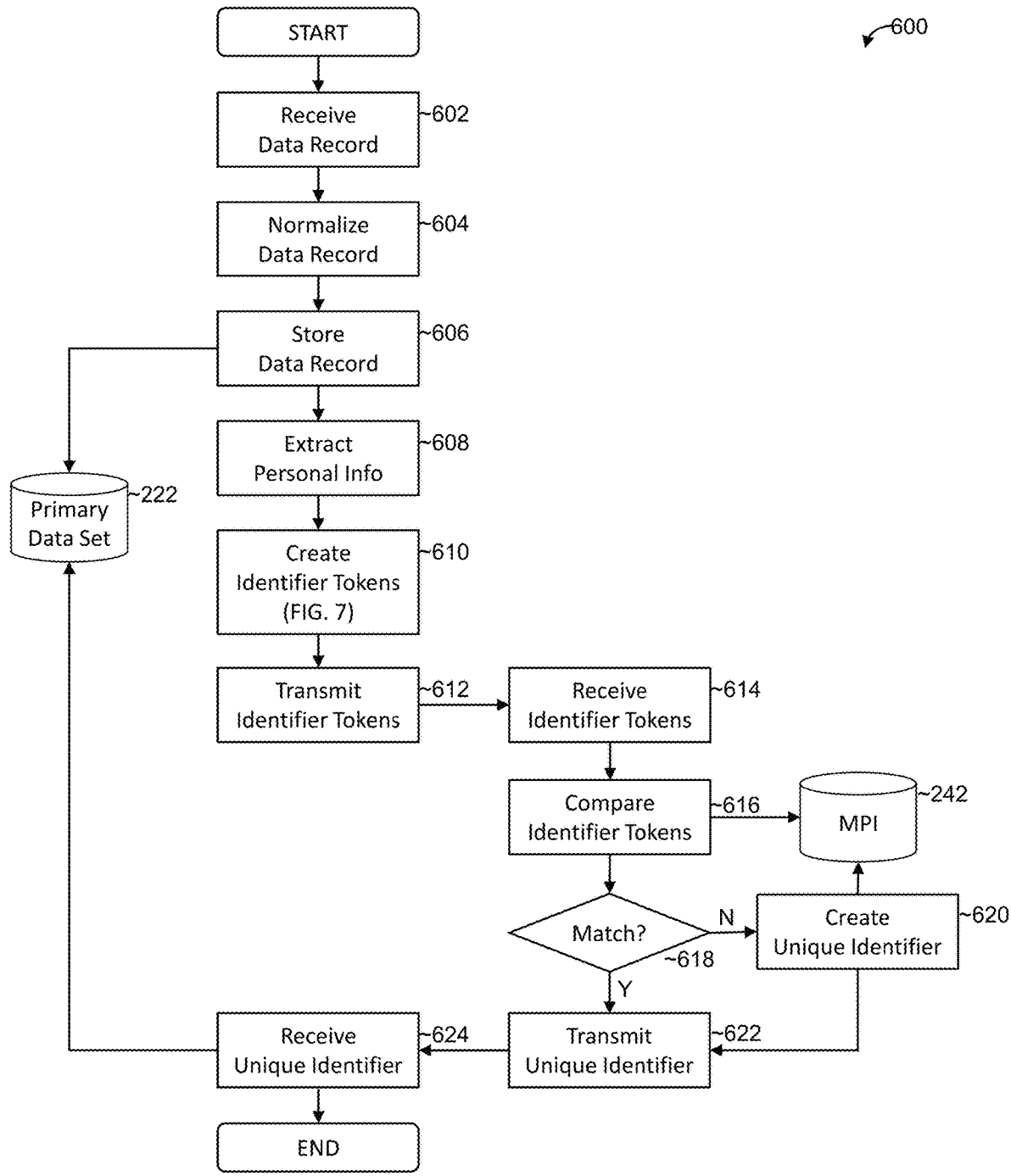
FIG. 6 is a flowchart illustrating an optional process for creating a unique identifier for each individual with at least one data record in multiple locations according to an exemplary embodiment of the present invention.

FIG. 6 is a flowchart illustrating an optional process 600 for creating a unique identifier for each individual with at least one data record in any of the primary data sets 222 according to an exemplary embodiment of the present invention. Steps 602-612 and 624 described below are performed by the processing unit 122 at the remote location 120 that receives the data record. Steps 614-622 described below are performed by the processing unit 142 at the central location 140.

As shown in FIG. 6, a data record comes in to any of the remote locations 120 in step 602. The data record may optionally be placed in common normalized format in step 604. The data record is stored in the primary data set 222 in step 606. The data record is inspected and predefined fields that include personally-identifying information are extracted from the data record in step 608. The personally-identifying information may include names, contact information such as a phone number or email address, location information such as street address or zip code, identifier numbers such as a driver's license number or social security number, and other demographics such as date of birth or gender.

The personally-identifying information is encrypted to create identifier tokens in step 610. The encryption process may be performed, for example, by the strong encryption module 228 (shown in FIG. 2). This encryption could take the form of standard cryptographic encryption, such as RSA or AES, one-way hash functions, such as SHA-256, or Bloom Filter encryption. In some cases, encryption of the information is not necessary, and generalization of the plain-text is sufficient (such as reducing a zip code to the corresponding three digit prefix). In the preferred embodiment of the invention, a mixture of these methods is used across different fields, depending on the nature of the data as well as the type and amount of expected noise. Notably, each remote location 120 includes identical software for processing this personal information into identifier tokens so that identical information is converted into identical identifier tokens (and similar information is converted into similar identifier tokens) regardless of which remote location 120 tokenizes the information.

FIG. 7 illustrates personally-identifying information and example identifier tokens created based on that personally-identifying information according to an exemplary embodiment of the present invention. FIG. 7 illustrates a few of the possible ways to represent the personal information and individual tokens. Example fields of personal information can include an individual's first and last name, gender, date of birth, location, email address, marital status, family relations, occupation, or an identifying number such as a subscriber ID or Social Security Number (SSN). Each of these fields may be transformed into a token, such as through the use of encryption, a hash function, a Bloom Filter, or possibly left as (truncated) plain text. Note that fields may be used to create tokens individually or in combination with each other, such as combining first and last name.

The identifier tokens created in step 610 and shown by way of example in FIG. 7 may be created by encrypting or truncating personally-identifiable information. By contrast, the unique identifiers created for each individual in process 600 may simply be an identification number created by the privacy-preserving analysis system 200 (for example, the next available identification number in a sequence.)

Referring back to FIG. 6, the identifier tokens are transmitted over encrypted communications to the central location 140 in step 612. The central location 140 receives the identifier tokens in step 614.

In order to determine if the system 200 has already created a unique identifier for the individual in the data record, the central location 140 compares to the identifier tokens against the master person index 242 in step 616. The master person index 242 contains the unique identifiers created for each individual in each of the primary data sets, along with the identifier tokens for their personally-identifiable information as described above with reference to FIG. 7. The master person index 242 may be prepopulated or empty when the system 200 is first deployed and grows each time a data record for a unique individual is received.

The personally-identifying information included in the data records in the primary data sets 222 may be noisy and incomplete. (In some instances, a data record may include a full name. In other instances, a data record may only include an initial, a nickname, an alias, etc. In another example, an address may be listed as "West Tasker Street" or "W. Tasker St.") Because the identifier tokens are created based on noisy and incomplete personally-identifiable information, the identifier tokens themselves may also be noisy and incomplete. Accordingly, the central location 140 may make a probabilistic determination in step 616 for whether the identifier tokens received in step 614 matches the identifier tokens for an individual already included in master person index 242.

If the central location 140 does not find a match (step 618: No), a new unique identifier is created and stored along with the identifier tokens in the master person index 242 in step 620 and the new unique identifier is transmitted back to the remote location 120 using encrypted communications in step 622. If the central location 140 finds a match (step 618: Yes), the unique identifier of the matching individual is transmitted back to the remote location 120 using encrypted communications in step 622. In either instance, the remote location 120 receives the unique identifier and adds it to the data record in the primary data set 222 in step 624.

As described above, the matching process 600 creates a unique identifier for each individual with at least one data record in any of the primary data sets 222 at any of the remote locations 120 and is ideally used as a single unique reference to be used for every instance of this person across all of the remote locations 120. Because the personally-identifying information in each data record may be noisy, ambiguous, or incomplete (for example, using potential variants and aliases), the matching process 600 is robust to these challenges and makes a single best effort to determine whether each new data record received in step 602 is a record for an individual that has already been assigned a unique identifier by the system 200.

Figure 8:
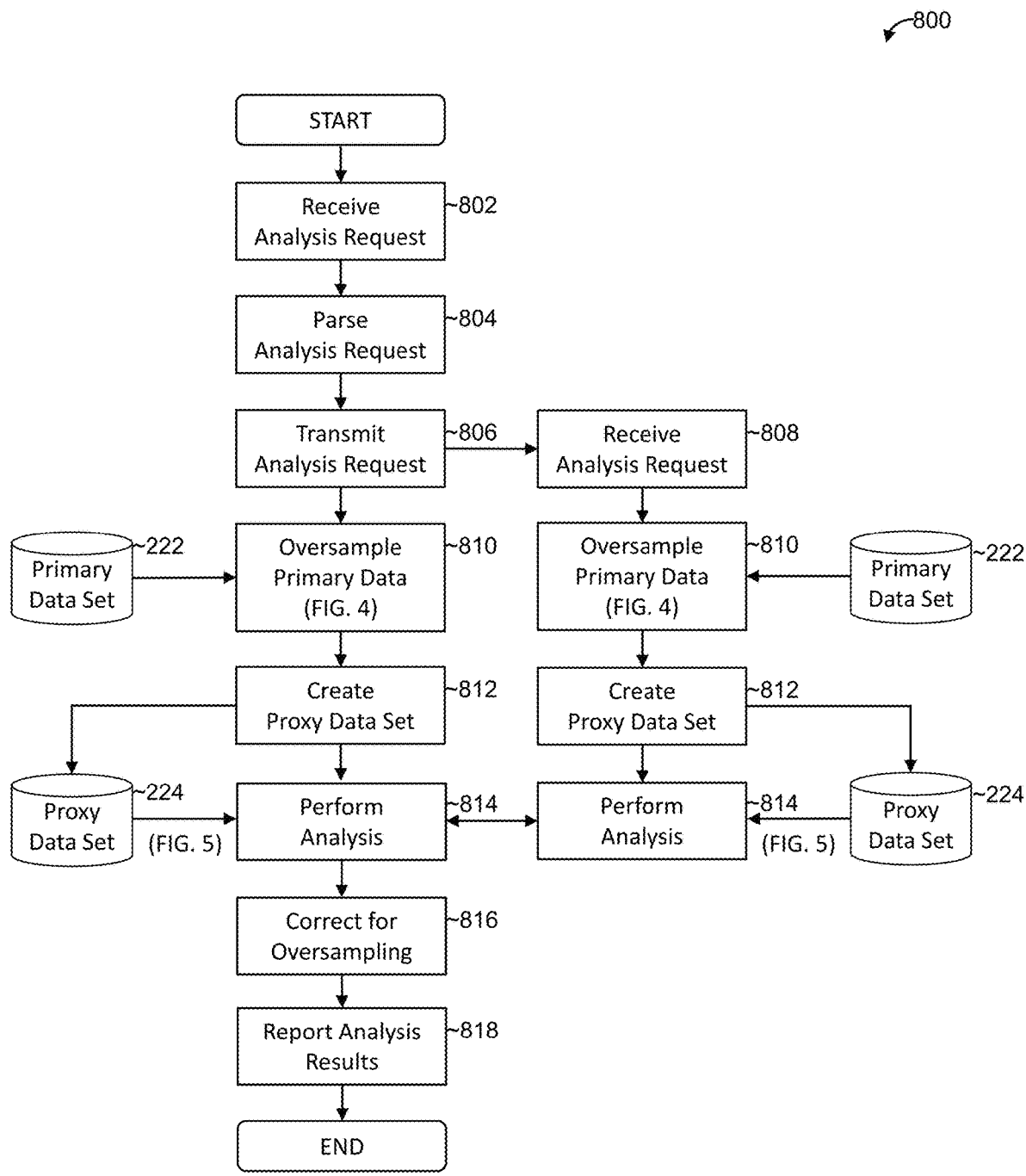
FIG. 8 is a flowchart illustrating a process for performing analysis of records stored in multiple locations according to an exemplary embodiment of the present invention.

FIG. 8 is a flowchart illustrating a process 800 for performing analysis while preserving the privacy of the individuals with records included in primary data sets 222 stored in multiple locations (e.g., at remote locations 120a, 120b, 120c, etc.) according to an exemplary embodiment of the present invention. Steps 802-806 and 810-818 described below are performed by the processing unit 122 of the lead collaborator 120a. Steps 808-814 are performed by the processing units 122 of the other remote locations 120b, 120c, etc.

Similar to step 302, an analysis request generated by a user is received by the lead collaborator 120a in step 802. Similar to step 304, the analysis request is parsed by the lead collaborator 120a in step 804.

The lead collaborator 120a shares the relevant parameters for the analysis, including the subpopulation to be used, with the other remote locations 120b-c in step 806. The relevant parameters are preferably transmitted using encrypted communication protocols. The other remote locations 120b-c receive the relevant parameters in step 808.

Once each remote location 120 knows the individuals and the local fields that will be used, each of the remote locations 120 (including the lead collaborator 120a) fetches the corresponding data records from its primary data set 222 in step 810.

Each remote location 120 oversamples the data records in the primary data set 222 using the process 400 described above with reference to FIG. 4 and stores the oversampled data records as a proxy data set 224 in step 812. Referring back to FIG. 4, each remote location 120 creates the same number of duplicates each data record in step 404, so that exactly N proxy data records are created for each data record in each of the primary data sets 222. Each of the remote locations 120 also uses the exact same process for assigning proxy identifiers in step 406 so that the same individual with data records in different primary data sets 222 will have exactly N proxy data records with matching proxy identifiers. For example, if 100 proxy records are created for each data record, the proxy identifier for each proxy data record may be the unique identifier created for the individual (created in step 620) with a suffix from 00 to 99.

The remote locations 120 perform the requested analysis using the proxy data sets 224 in step 814. The requested analysis is performed, for example, by the statistical analysis modules 226 (shown in FIG. 2) at each of the remote locations 120. The remote locations 120 may perform the requested analysis using secure multiparty computation (SMC). For example, the remote locations 120 may use the process described by Vaidya & Clifton in "Privacy-Preserving Decision Trees over Vertically Partitioned Data" or another comparable implementation. The secure multiparty computing functions may be performed, for example, using the homomorphic encryption modules 229 (shown FIG. 2) at each of the remote locations 120. Additionally, because the system 200 is performing the requested analysis using data records that have been duplicated and that include fields that have been randomly masked, each remote location 120 uses the process 500 described above with reference to FIG. 5 to read each of the proxy data sets 224.

Similar to step 316, the system 200 corrects for the fact that the proxy data records have been used in step 816. Again, the result of the analysis using the proxy data records are divided by $N*(1-P)^B$, where N is the oversampling factor, P is the probability of masking any given field, and B is the number of times that the population was subdivided as shown in FIG. 5. Similar to step 318, the results of the analysis are reported to the requesting party in step 818.

While preferred embodiments have been set forth above, those skilled in the art who have reviewed the present disclosure will readily appreciate that other embodiments can be realized within the scope of the invention. Disclosures of specific numbers of hardware components and software modules are illustrative rather than limiting. For example, two databases (a primary data set 222 and a proxy data set 224) are described in detail above with a description of information that may be included in each of those databases at each of the remote locations 120. As one of ordinary skill in the art would recognize, the information described above may be stored in any manner, so long as the information is accessible to the processing units 122. Accordingly, the present invention should be construed as limited only by the appended claims.

The invention claimed is:

1. A method of analyzing a plurality of primary data records that each include a plurality of fields, the method comprising:
   oversampling the plurality of primary data records to create a plurality of proxy data records, the proxy data records comprising N duplicates of each of the primary data records;
   masking some of the fields in the proxy data records such that the average rate that any given field is masked is P;
   receiving an analysis request to estimate the number of primary data records where one or more specified fields satisfy one or more specified thresholds;
   repeatedly partitioning the proxy data records for each combination of specified field and specified threshold included in the analysis request to determine the number of proxy data records where the one or more specified fields satisfy the one or more specified thresholds; and
   estimating the number of primary data records where the one or more specified fields satisfy the one or more specified thresholds by dividing the number of proxy data records where the one or more specified fields satisfy the one or more specified thresholds by $N*(1-P)^B$, where B is the number of times the proxy data records are partitioned.

2. The method of claim 1, wherein determining that a specified field in a proxy data record satisfies a specified threshold comprises:
   determining that the specified field is unmasked;
   determining that the specified field is populated; and
   determining that the specified field satisfies the specified threshold.

3. The method of claim 1, wherein the primary data records are stored in a plurality of disparate databases.

4. The method of claim 3, wherein the disparate databases are located at remote locations.

5. The method of claim 4, wherein the remote locations include processing units that analyze the plurality of primary data records using secure multiparty computing.

6. The method of claim 4, wherein some of the plurality of fields include personally-identifying information, the method further comprising:
   extracting and encrypting the personally-identifying information to create identifier tokens based on the personally-identifying information.

7. The method of claim 6, wherein each of the processing units at each of the remote locations are configured to encrypt the personally-identifying information using the same encryption process and encryption keys.

8. The method of claim 7, further comprising:
   generating a unique identifier for each individual with at least one primary data record in the remotely-stored databases.

9. The method of claim 8, wherein generating a unique identifier for an individual comprises:
   storing, at a central location, a master list of unique identifiers previously generated for individuals and the identifier tokens created using the personally-identifying information of the individuals;
   for each new primary data record received at a remote location, transmitting the identifier tokens created using the personally-identifying information included in the new primary data record to the central location;
   determining whether the identifier tokens created using the personally-identifying information included in the new primary data record matches the identifier tokens for any individual with a previously generated unique identifier; and
   in response to a determination that the identifier tokens created using the personally-identifying information included in the new primary data record matches the identifier tokens for an individual with a previously generated unique identifier, associating the previously generated unique identifier with the new primary data record; or
   in response to a determination that the identifier tokens created using the personally-identifying information included in the new primary data record do not match the identifier tokens for any individual with a previously generated unique identifier, generating a new unique identifier and associating the new unique identifier with the new primary data record.

10. The method of claim 9, wherein determining whether the identifier tokens match comprises probabilistically determining whether the identifier tokens match.

11. A system for analyzing a plurality of primary data records that each include a plurality of fields, comprising:
   non-transitory computer readable storage media that store:
      one or more databases that include the plurality of primary data records; and
      one or more databases that include a plurality of proxy data records; and
   one or more hardware processing units that:
      oversample the plurality of primary data records to create the plurality of proxy data records, the proxy data records comprising N duplicates of each of the primary data records;
      mask some of the fields in the proxy data records such that the average rate that any given field is masked is P;
      receive an analysis request to estimate the number of primary data records where one or more specified fields satisfy one or more specified thresholds;
      repeatedly partition the proxy data records for each combination of specified field and specified threshold included in the analysis request to determine the number of proxy data records where the one or more specified fields satisfy the one or more specified thresholds; and
      estimate the number of primary data records where the one or more specified fields satisfy the one or more specified thresholds by dividing the number of proxy data records where the one or more specified fields satisfy the one or more specified thresholds by $N*(1-P)^B$, where B is the number of times the proxy data records are partitioned.

12. The system of claim 11, wherein the one or more processing units determine that a specified field in a proxy data record satisfies a specified threshold by:
   determining that the specified field is unmasked;
   determining that the specified field is populated; and
   determining that the specified field satisfies the specified threshold.

13. The system of claim 11, wherein the one or more databases that store the plurality of primary data records comprise a plurality of databases that store the plurality of primary data records.

14. The system of claim 13, wherein:
   each of the plurality of databases is located at a remote location;
   the one or more processing units comprise a plurality of processing units; and
   each of the plurality of processing units is located at one of the remote locations.

15. The system of claim 14, wherein the plurality of processing units analyze the plurality of primary data records using secure multiparty computing.

16. The system of claim 14, wherein:
   some of the plurality of fields include personally-identifying information; and
   the plurality of processing units extract and encrypt the personally-identifying information to create identifier tokens based on the personally-identifying information.

17. The system of claim 16, wherein each of the processing units at each of the remote locations encrypt the personally-identifying information using the same encryption process and encryption keys.

18. The system of claim 17, wherein the system generates a unique identifier for each individual with at least one primary data record in the remotely-stored databases.

19. The system of claim 18, further comprising
   a database at a central location that includes a master list of unique identifiers previously generated for individuals and the identifier tokens created using the personally-identifying information of the individuals;
   a processing unit at the central location that generates the unique identifier for each new primary data record received at a remote location by:
      receiving the identifier tokens created using the personally-identifying information included in the new primary data record;
      determining whether the identifier tokens created using the personally-identifying information included in the new primary data record matches the identifier tokens for any individual with a previously generated unique identifier; and
      in response to a determination that the identifier tokens created using the personally-identifying information included in the new primary data record matches the identifier tokens for an individual with a previously generated unique identifier, associating the previously generated unique identifier with the new primary data record; or in response to a determination that the identifier tokens created using the personally-identifying information included in the new primary data record do not match the identifier tokens for any individual with a previously generated unique identifier, generating a new unique identifier and associating the new unique identifier with the new primary data record.

20. The system of claim 19, wherein the processing unit at the central location probabilistically determines whether the identifier tokens match.

* * * * *